United States Patent [19]
Ackeret

[11] Patent Number: 4,811,995
[45] Date of Patent: Mar. 14, 1989

[54] STORAGE CONTAINER FOR DISC-FORM RECORDING MEDIA

[76] Inventor: Peter Ackeret, Allmendstr. 18, CH-8700 Kusnacht, Switzerland

[21] Appl. No.: 936,146

[22] Filed: Dec. 1, 1986

Related U.S. Application Data

[63] Continuation of Ser. No. 644,960, Aug. 28, 1984.

[30] Foreign Application Priority Data

Aug. 29, 1983 [EP] European Pat. Off. ........ 83108478.5
Aug. 29, 1983 [EP] European Pat. Off. ........ 83108481.9
Aug. 2, 1984 [DE] Fed. Rep. of Germany ... 8423026[U]

[51] Int. Cl.⁴ .............................................. A47B 81/06
[52] U.S. Cl. ......................................... 312/15; 312/12; 312/319
[58] Field of Search ............... 312/12, 15, 330, 348, 312/319; 206/387

[56] References Cited

U.S. PATENT DOCUMENTS

| | | | |
|---|---|---|---|
| 1,850,790 | 3/1932 | Levi | 312/12 |
| 1,895,061 | 1/1933 | Warssam | 312/319 X |
| 2,513,150 | 6/1950 | Davis | 312/319 X |
| 2,539,647 | 1/1951 | Williams et al. | 312/19 |
| 3,275,158 | 9/1966 | Glass | 211/40 |
| 3,836,222 | 9/1974 | Kutze | 312/319 |
| 3,942,639 | 3/1976 | Cournoyer et al. | 312/10 X |
| 4,087,145 | 5/1978 | Weavers | 312/319 |
| 4,399,913 | 8/1983 | Gelardi et al. | 312/10 |

FOREIGN PATENT DOCUMENTS

| | | |
|---|---|---|
| 86275 | 8/1983 | European Pat. Off. . |
| 1131026 | 6/1962 | Fed. Rep. of Germany . |
| 2307410 | 8/1974 | Fed. Rep. of Germany . |
| 1113766 | 4/1956 | France . |
| 794216 | 4/1958 | United Kingdom . |

*Primary Examiner*—Joseph Falk
*Attorney, Agent, or Firm*—Chilton, Alix & Van Kirk

[57] ABSTRACT

A storage container for record discs having a small diameter comprises a housing and plural disc holders which may selectively be ejected from the housing, under the influence of ejection springs, so that the disc carried by the ejected holder can be utilized. The disc holders, which are slidably mounted relative to the housing, are provided with driver members that securely couple the disc to the holder during movement between the stored and ejected positions and restraining members which prevent the separtation of the disc from the holder when the ejection stroke is arrested.

15 Claims, 12 Drawing Sheets

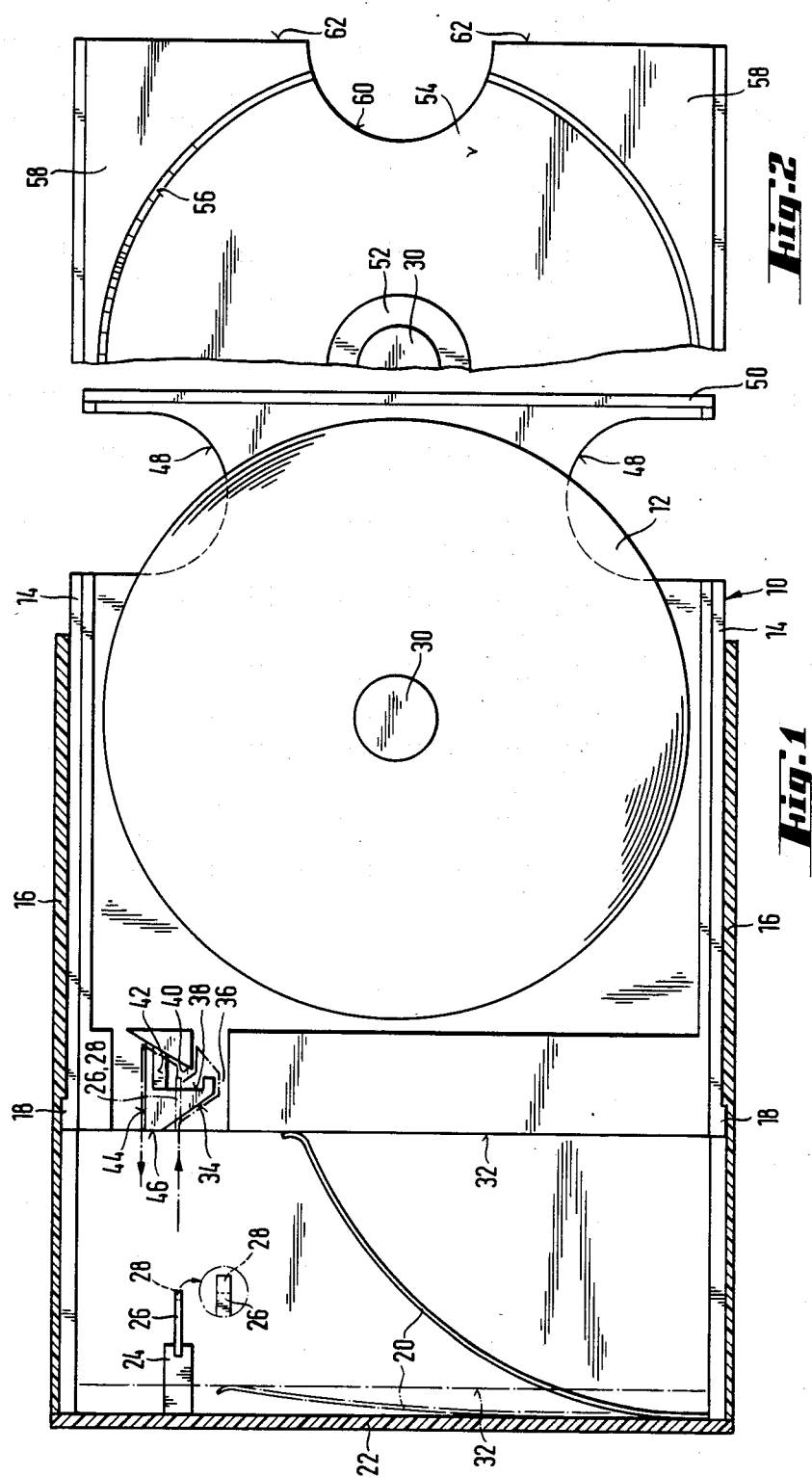

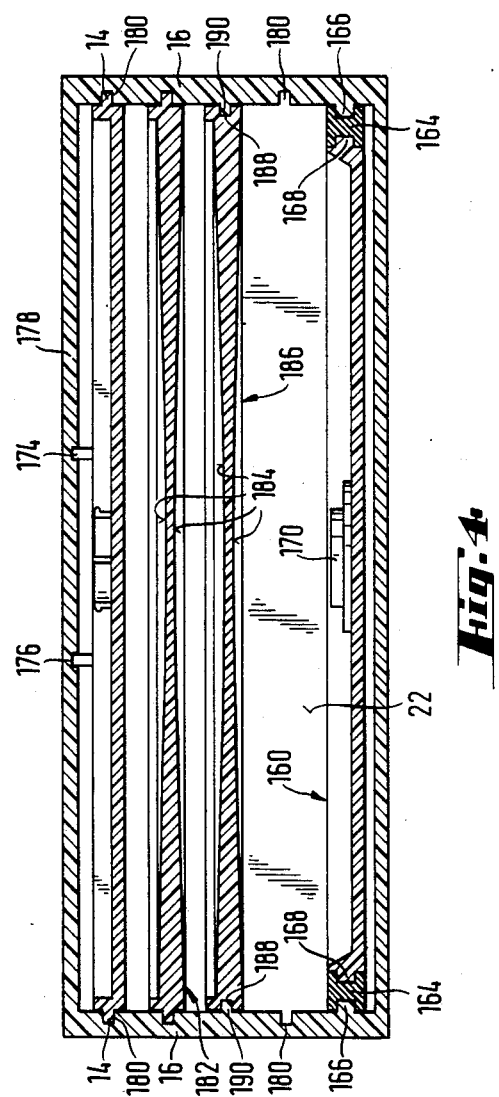

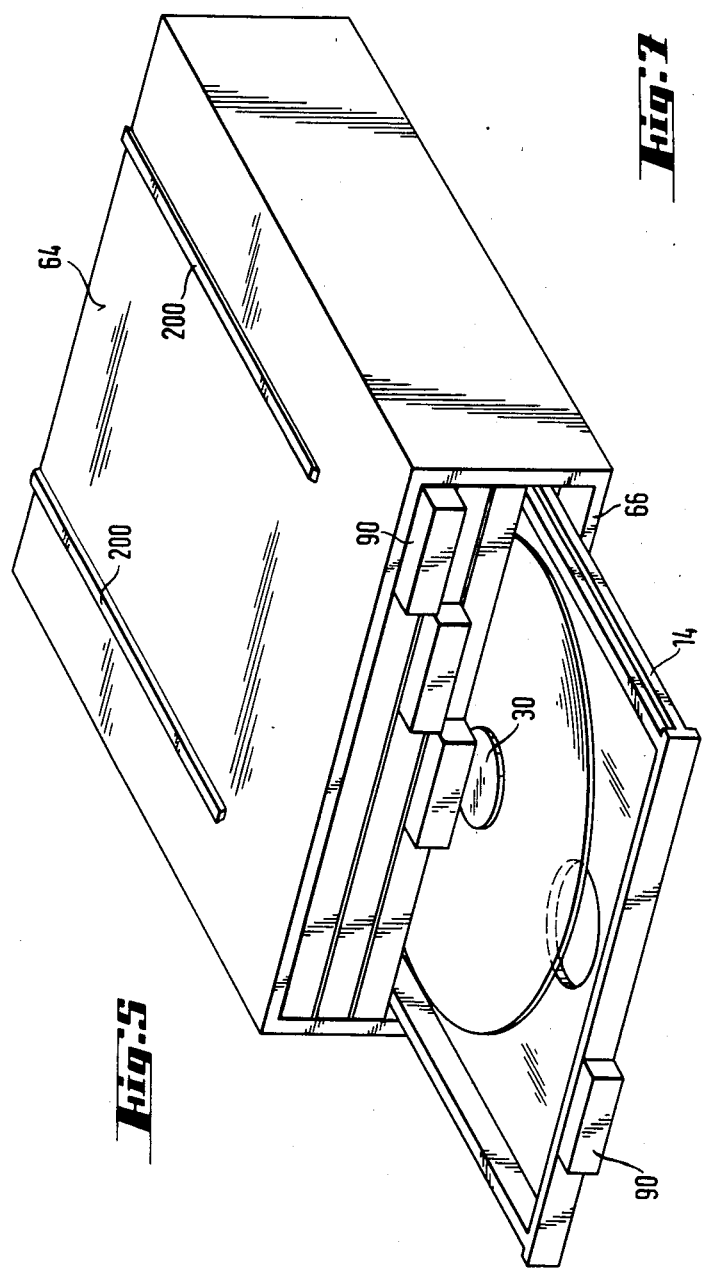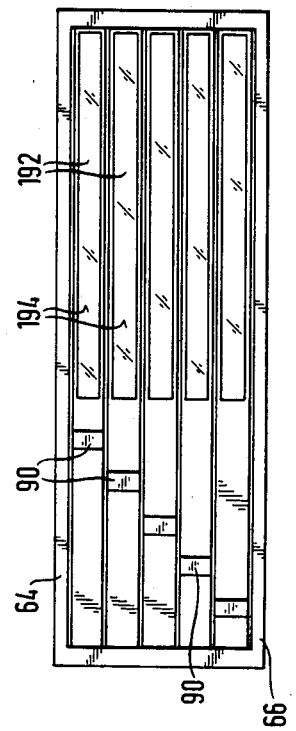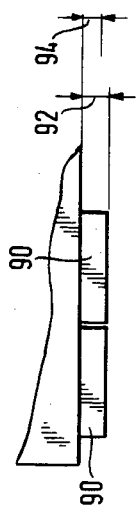

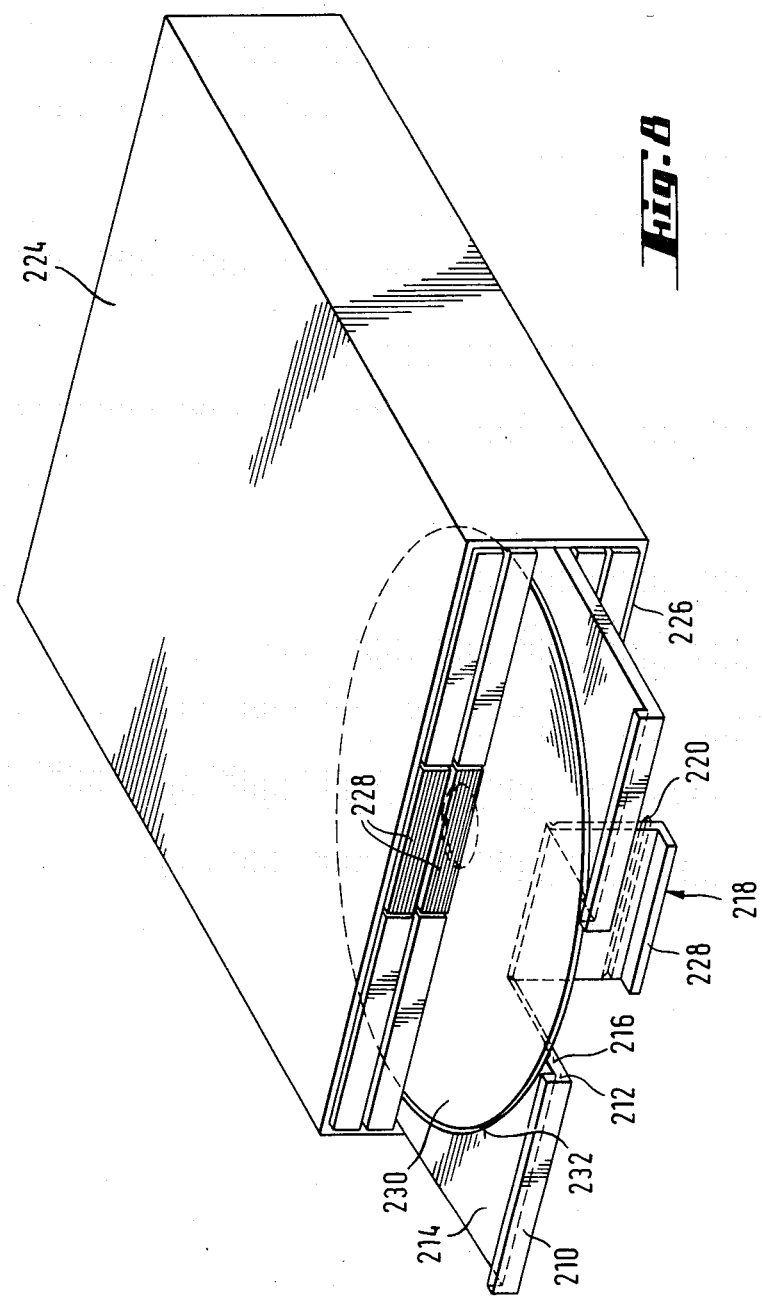

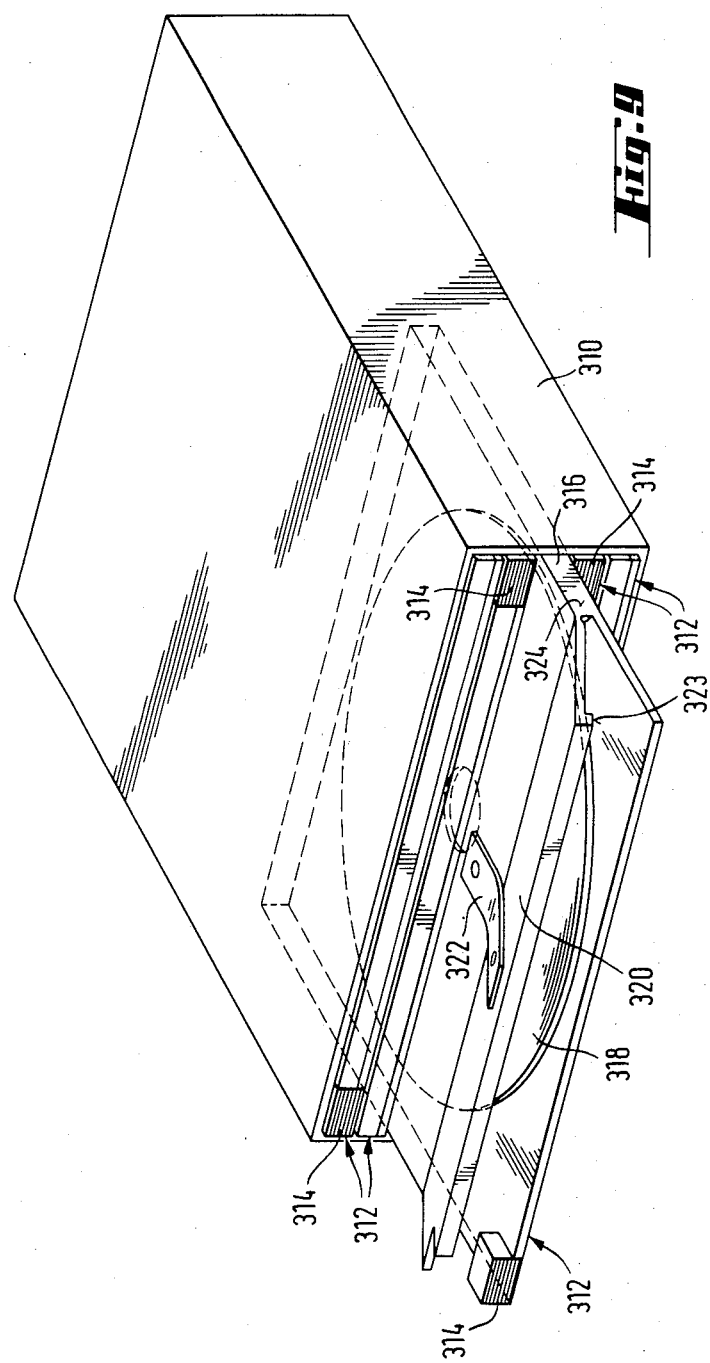

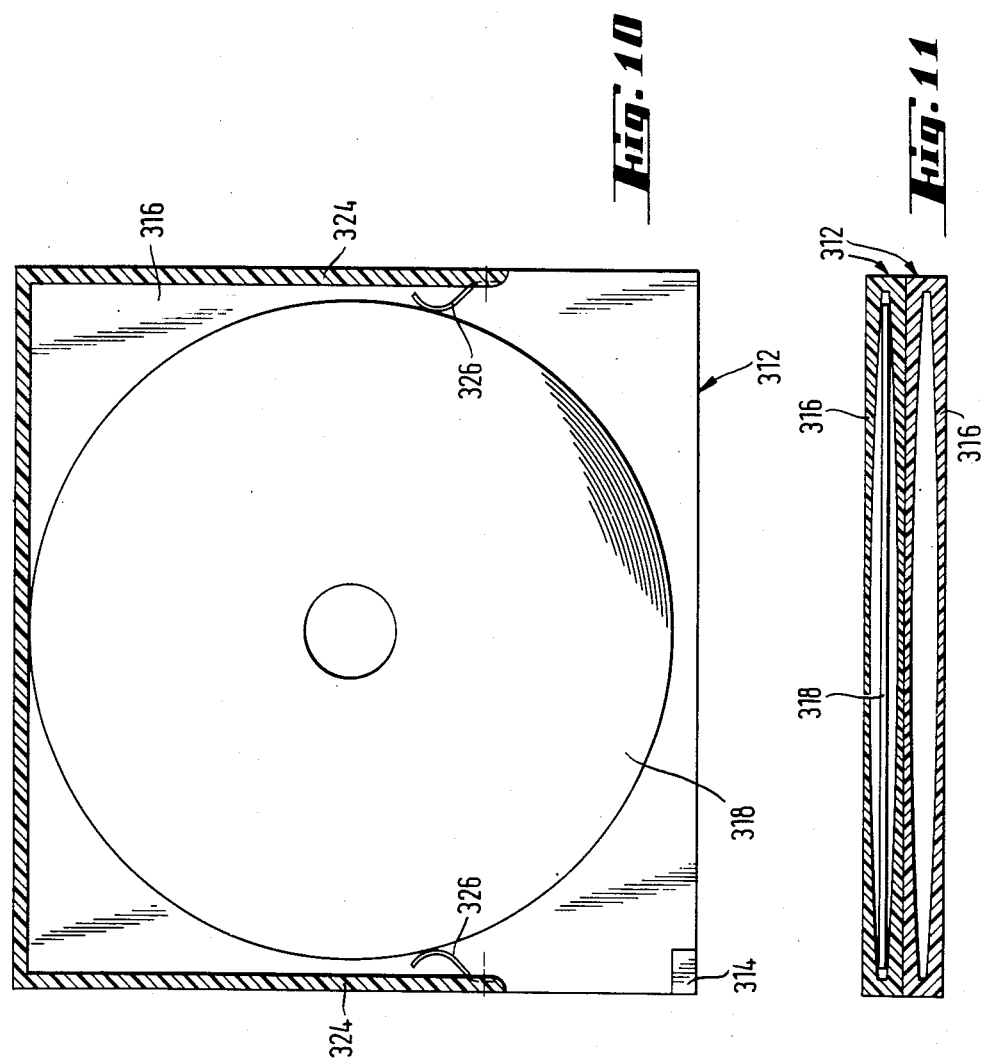

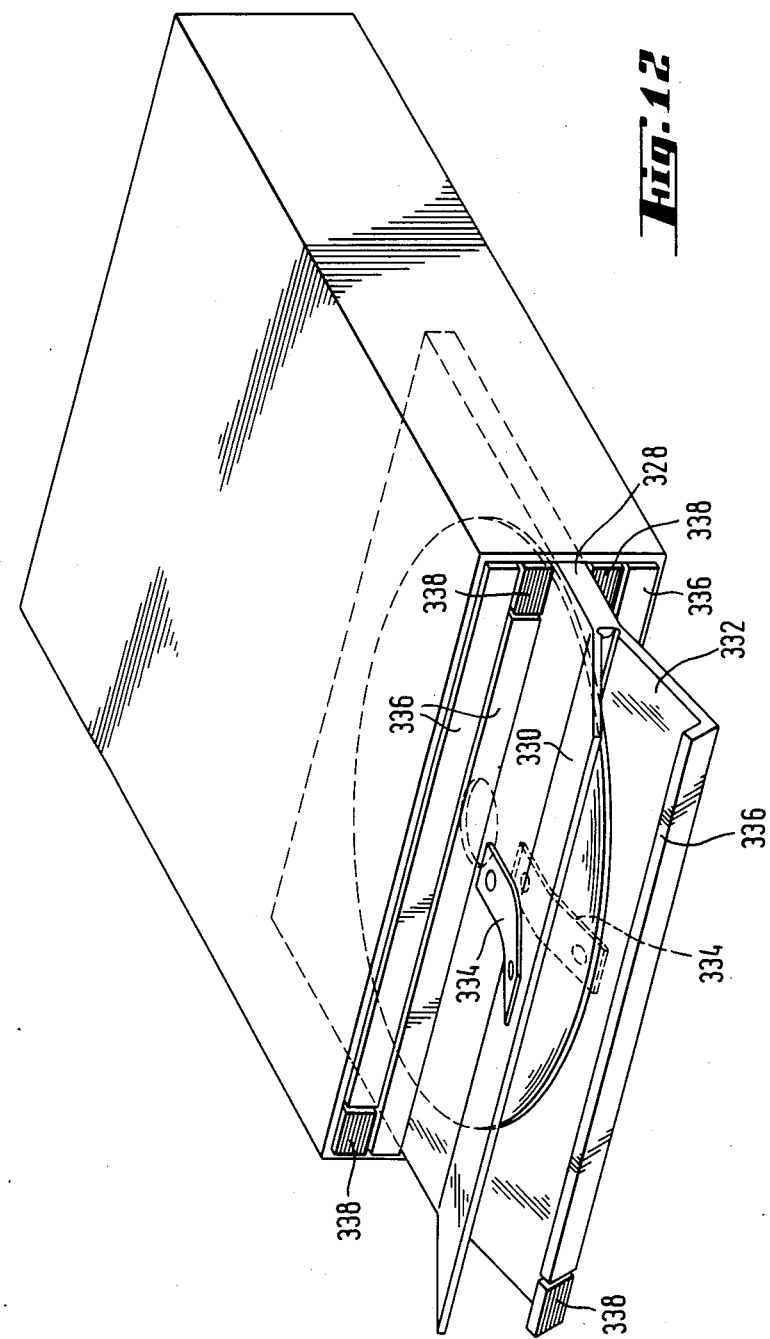

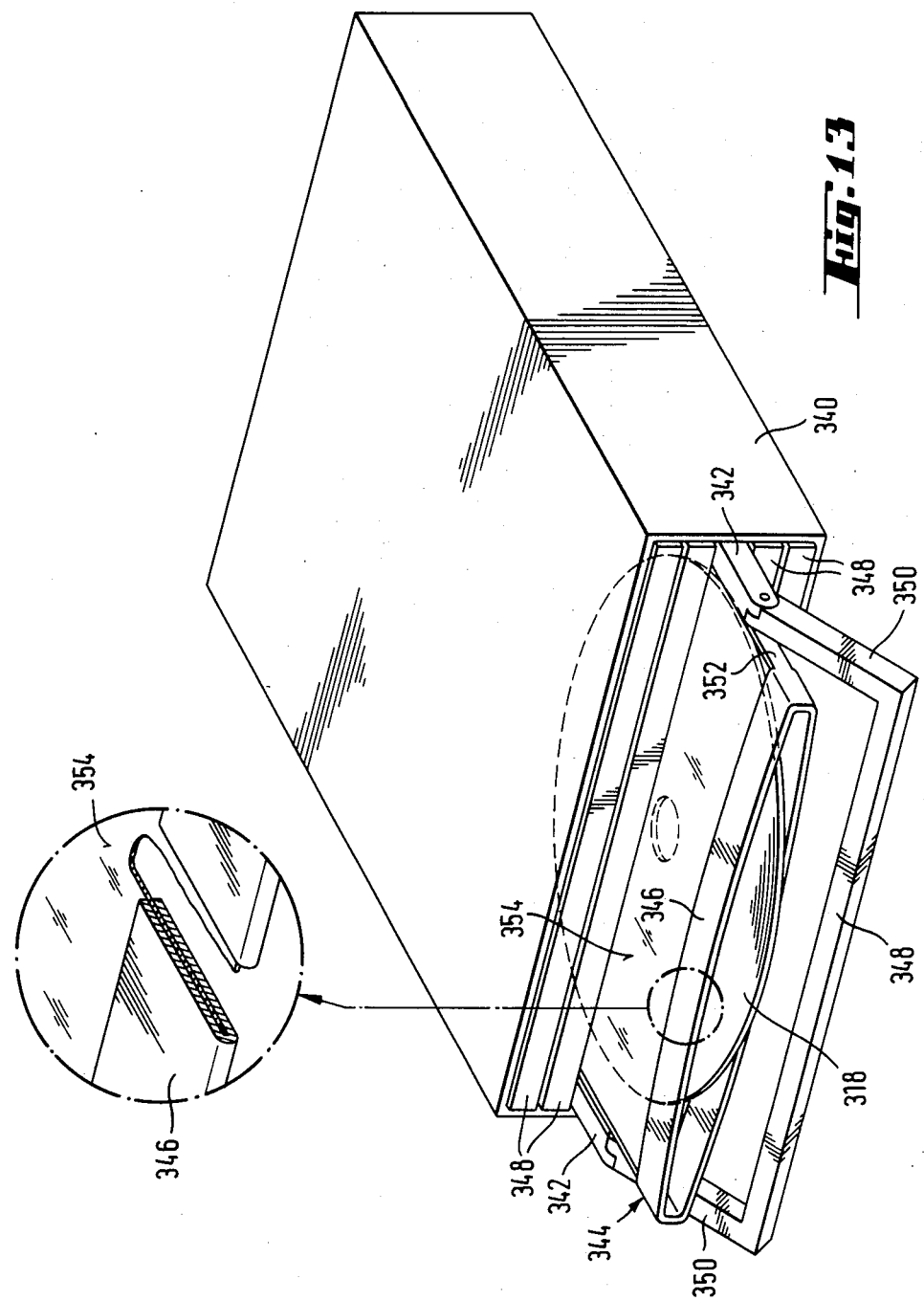

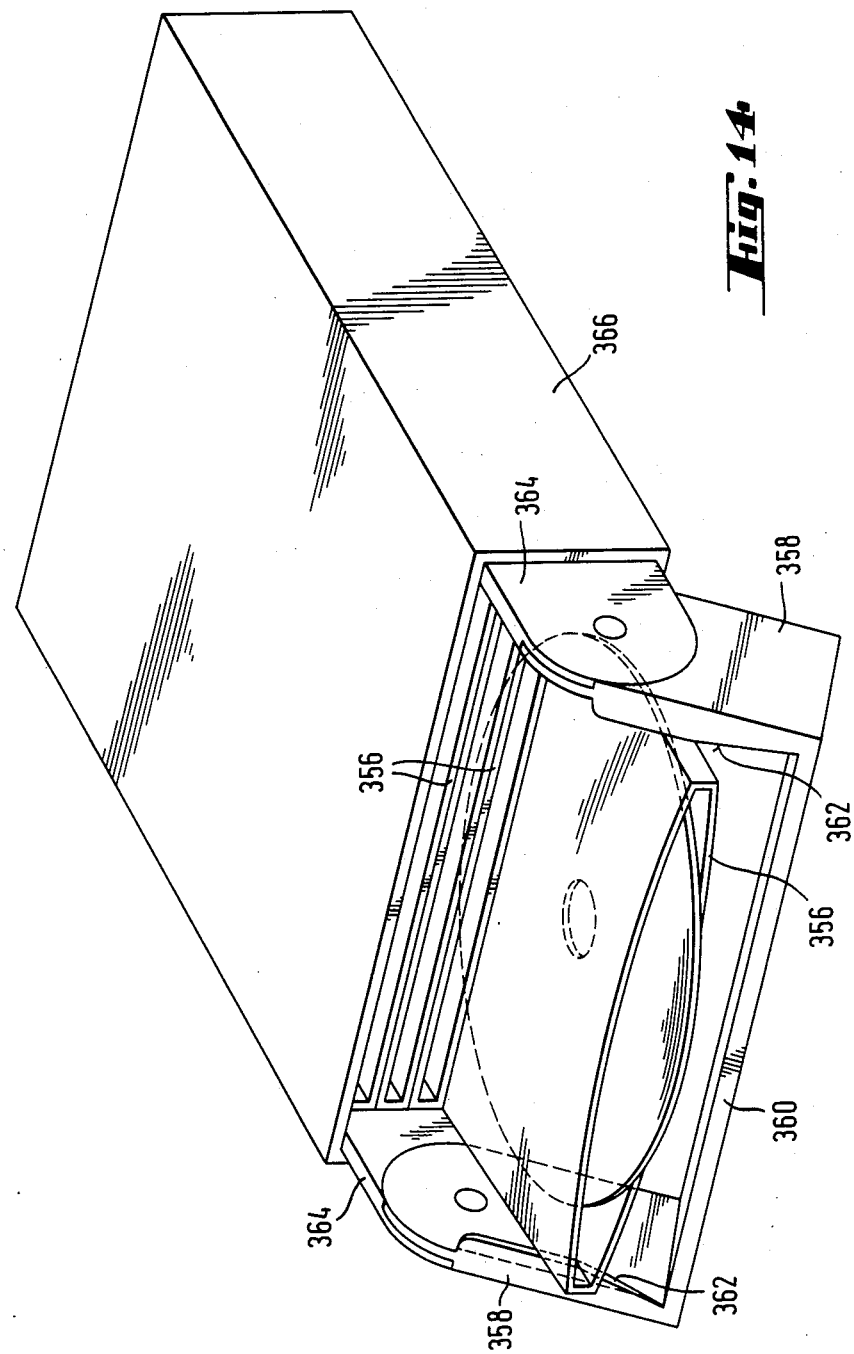

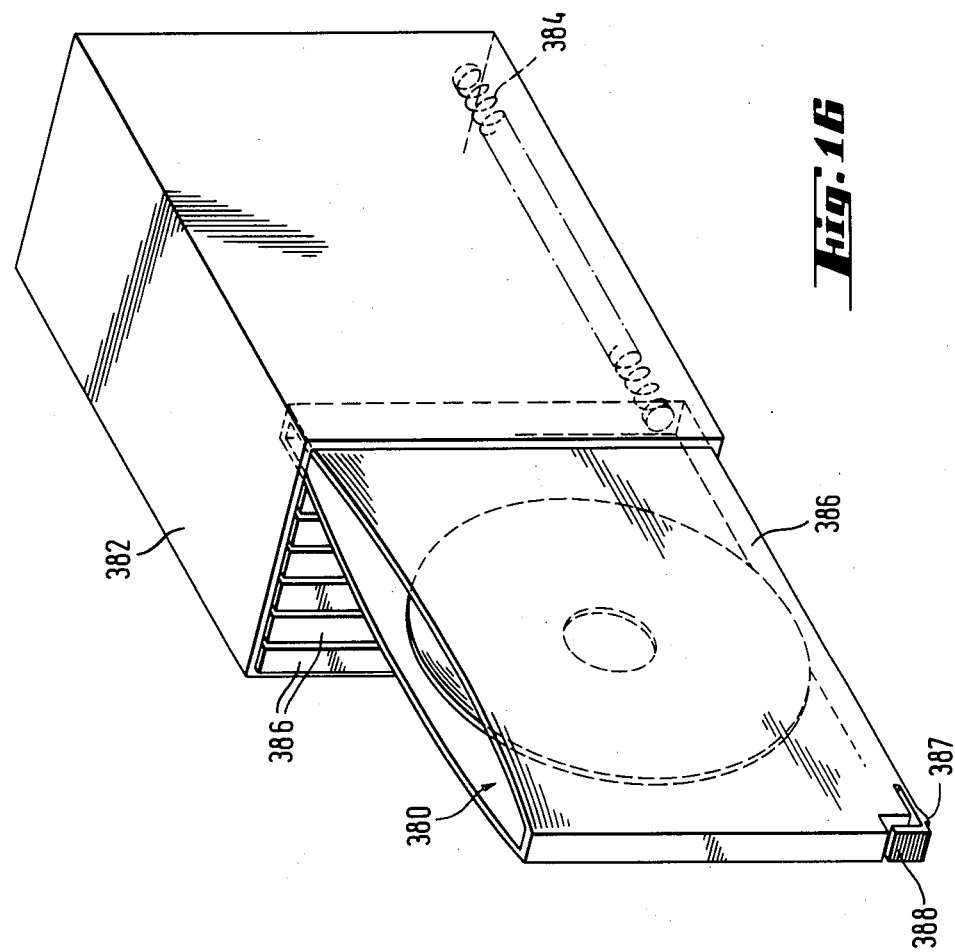

STORAGE CONTAINER FOR DISC-FORM RECORDING MEDIA

This is a continuation of application Ser. No. 644,960 filed Aug. 28, 1984.

(1) Field of the Invention

The present invention relates to storage containers for disc-form recording media and particularly to magazines for use in the storage of "compact" discs and suitable for motor vehicle installation. More specifically, this invention is directed to the safe storage and subsequent retrieval of laser-scannable gramophone and video discs. Accordingly, the general objects of the present invention are to provide novel and improved apparatus and methods of such character.

(2) Description of the Prior Art

Devices for the storage of disc-form recording media are known in the art. Such devices, for example as shown in German Pat. No. 1,131,026, hold the record discs in a protected location, and usually in the paper envelope in which discs are sold, and are capable of presenting a stored disc for use. The prior art record disc storage apparatii, however, are essentially pieces of furniture which are designed for use in the storage of long-playing records. The storage apparatii, accordingly, have had a generally box-like configuration with an access door. A plurality of flat, plate-like holders are supported in horizontally oriented planes in the box-like pieces of furniture and the records, in their protective envelopes or sleeves, merely rest on the holders. The prior devices also included selection buttons which, when actuated with the access door open, would cause the holder associated with the actuated button to be moved at least partly out of the housing under the influence of an ejection spring arrangement.

There have recently been significant improvements in the field of recording. One of the more important of these improvements is the laser-scannable gramophone or video disc which is known in the trade as a "compact" disc. These compact discs are characterized by higher quality reproduction, particularly in the case of audio information, and reduced sensitivity to manual manipulation. Play-back apparatii for such compact discs and suitable for motor vehicle installation are now available. When using such play-back apparatii, the compact disc does not have to be placed manually on a turntable but may simply be inserted through a slot in the front face of the apparatii.

While not limited thereto in its utility, the present invention is particularly well suited for use in the storage of compact discs in the motor vehicle environment. In order to be suitable for use in a motor vehicle, a storage container for compact discs must satisfy a number of conditions. Thus, the operator of the vehicle should be able to operate the storage system with one hand. Also, selection and return of a disc to storage should be possible without the vehicle operator having to change his grip on the disc and the operator's attention should not have to be diverted to the storage system in order to withdraw discs from or return discs to the same. Additionally, the storage system should be capable of mass-production and should be relatively inexpensive. Further, in view of space limitations, the storage system should be capable of installation in a vehicle in various attitudes, i.e., it must be capable of functioning regardless of the angular orientation of the planes defined by the stored discs.

While the storage apparatus of the above-mentioned German Patent could be modified to accept compact discs, and its size thus significantly reduced, it would nevertheless not fulfill any of the conditions specified above for motor vehicle installation. For example, the ease of operation of the prior art apparatus is poor because, before a record in its protective sleeve can be removed therefrom, an access door must be manually opened. Secondly, even when a record has been presented to the user, it must first be removed from its protective envelope or sleeve before being inserted in the play-back apparatus. It should be noted that if a compact disc was to be placed on a holder of the prior apparatus without a protective sleeve, thus making manipulation easier, the disc could be damaged by abrasive contact with the holder.

The record disc holders of the prior art apparatus are intended to be arranged horizontally. If, for example, it was necessary to transport a stored disc vertically, stronger ejection springs would be required since such springs would have to overcome the force of gravity in addition to frictional forces. Use of ejection springs of sufficient strength to permit vertical operation would result, if the apparatus was installed with the disc holders lying in horizontal planes, in a selected disc being accelerated from the outer housing of the apparatus at a rate which would result either in the disc failing to move with the holder or, when the ejected holder was braked, the disc being catapulted therefrom. In any event, even if the ejection spring arrangement was to be made adjustable in some manner, the operator of the system would still be faced with the somewhat difficult task of removing the disc from a smooth, flat holder.

SUMMARY OF THE INVENTION

The present invention overcomes the above discussed and other deficiencies and disadvantages of the prior art and, in so doing, provides improved methods and apparatii for the storage and retrieval of disc-form recording media and particularly compact discs. The methods and apparatii of the present invention are particularly well suited for use in the environment of a motor vehicle. In accordance with the invention a stored record disc is supported on a generally plate-shaped holder and moves only therewith, i.e., the disc will be reliably transported from the storage position within a housing to a removal position where it is at least partly outside of the housing and will not catapulted from the holder.

A disc holder in accordance with the present invention supports the record disc in such a manner that the recording area thereof is unable to come into abrasive contact with surfaces on the holder during storage, when it may be subject to constant vibration, or during removal or insertion.

Apparatus in accordance with the present invention comprises a housing which has an access opening at one side thereof. At least a first disc holder is slidably supported in the housing. The disc holder is spring biased to the ejected or disc removal position. The disc holder will be locked in the inserted or storage position and the apparatus further comprises means for releasing the locking mechanism whereby the holder will be transported to the ejected position. The disc holder will have a drive member which reliably couples the holder to a record disc supported thereon during movement from the stored to the ejected position and means are also provided on the holder to restrain the disc so that it will not move as a result of the kinetic energy stored therein as a result of the acceleration of the holder during travel from the inserted to the ejected positions.

In accordance with some embodiments of the present invention the disc holder may be provided with a front wall and the holder will be configured so as to permit the user the grasp the disc and lift it over this front wall. In other embodiments the holder will have a movable front wall which is pivoted out of the plane occupied by a stored disc after the ejection stroke of the holder has been completed. In still other embodiments of the invention the holder is provided with means for lifting an edge region of the disc upwardly when the holder reaches the ejected position so as to facilitate the grasping of the disc by the user.

BRIEF DESCRIPTION OF THE DRAWING

The present invention may be better understood, and its numerous objects and advantages will become apparent to those skilled in the art, by reference to the accompanying drawing wherein like reference numerals refer to like elements in the several FIGURES and in which:

FIG. 1 a top plan view, with the housing being shown in cross-section, of record disc storage apparatus in accordance with a first the present invention;

FIG. 2 is a partial view, taken in the same direction as FIG. 1, of a form of the embodiment of FIG. 1;

FIG. 4 is a cross-sectional front elevation view which depicts further features of various embodiments of the present invention;

FIG. 5 is a perspective view of a storage system in accordance with yet another embodiment of the present invention;

FIG. 6 is a partial top plan view showing the arrangement of the release of the embodiment of FIG. 5;

FIG. 7 is a front elevation view of a modified form of the embodiment of FIG. 5;

FIG. 8 is a perspective view of another record disc storage system in accordance with the present invention;

FIG. 9 is a perspective view of a recording disc storage system in accordance with yet another embodiment of the present invention;

FIG. 10 is a cross-sectional top plan view of a disc holder of the of FIG. 9;

FIG. 11 is a partial cross-sectional side elevation view of two of the disc holders of the embodiment of FIG. 9;

FIG. 12 is a perspective view of a record disc storing system which comprises a modification of the embodiment of FIG. 9;

FIG. 13 is a perspective view of a record disc storage system in accordance with still another embodiment of the present invention;

FIG. 14 is a perspective view of apparatus in accordance with a further embodiment of the invention, the embodiment of FIG. 14 being a modification of the embodiment of FIG. 13;

FIG. 16 is a perspective view of still another embodiment of the present invention.

DESCRIPTION OF THE DISCLOSED EMBODIMENTS

Figure 3:
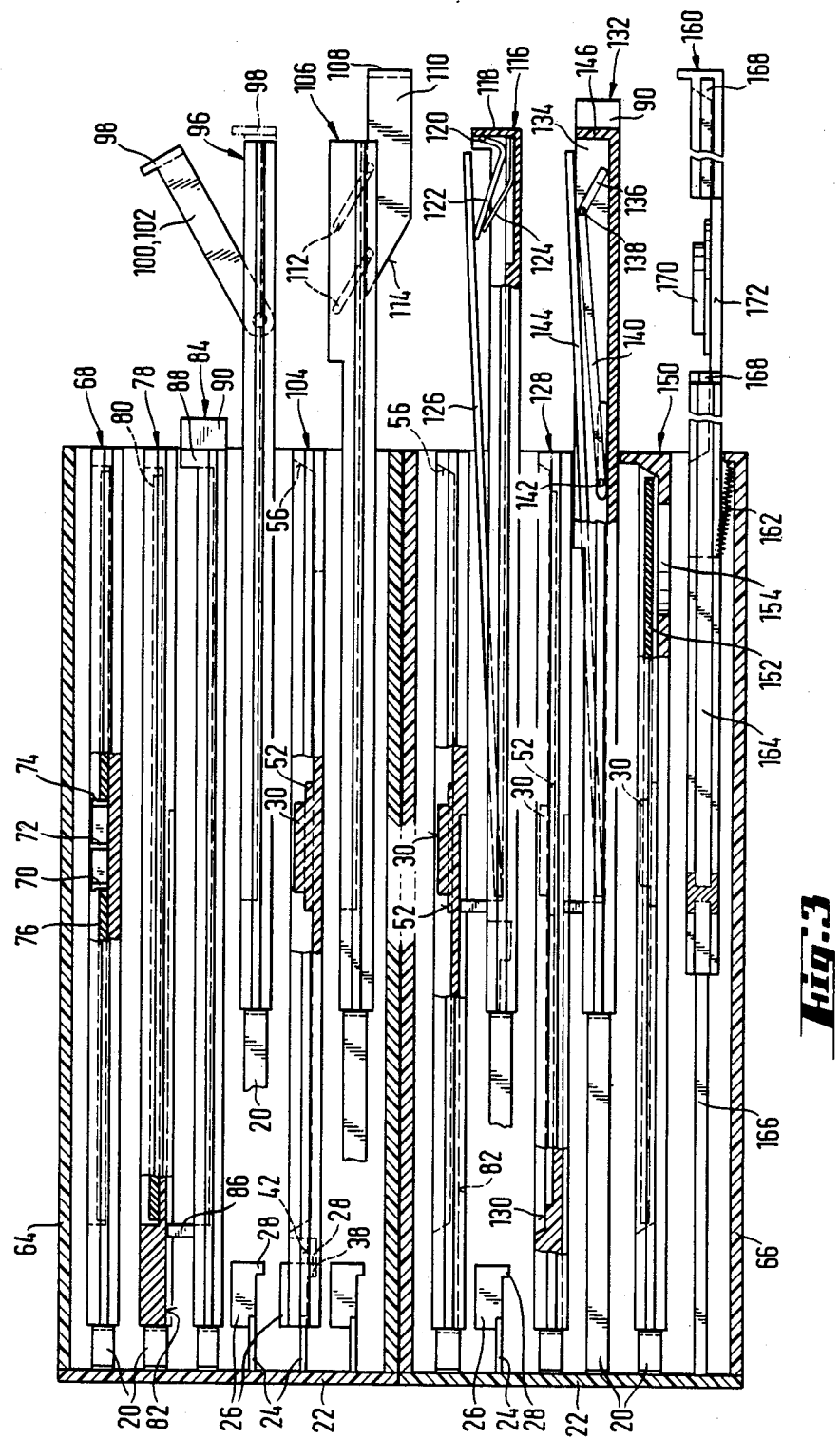
FIG. 3 is a cross-sectional side elevation view which depicts twelve different embodiments of record disc holders which may be employed in the present invention.

Before discussing the drawing, it is to be noted that all of the disclosed embodiments of the present invention are containers or magazines for use in the storage of so-called "compact" record discs. The ejection spring arrangement and the locking system may be the same for each embodiment and thus will be described only with respect to the embodiment of FIG. 1, it being understood that the same locking and ejection spring mechanisms are present in the apparatii shown in all of the other FIGURES.

With reference now to FIG. 1, a holder for a compact disc 12 is indicated generally at 10. Holder 10 is slidably supported within a housing which is open on one side. The housing, in part, is comprised of parallel side walls 16 and a rear wall 22. In order to achieve the requisite support of holder 10 and to permit its motion between the ejected position, in which it is, shown and an inserted or storage position, the holder is provided with integral guide rails 14 (see also FIGS. 4 and 5) which engage guide slots or channels formed in the side walls 16 of the housing (see also FIG. 4). The inner extreme position, i.e., the storage position, and the distance traveled by holder 10 upon ejection are respectively determined by a locking mechanism and by mechanical stops 18. The force which produces movement of holder 10 from the stored to the ejected positions is provided by a leaf-type ejection spring 20 which has a first end attached to the inside of the rear wall 22 of the housing. Leaf spring 20 contacts, at its other or free end, the inner end 32 of holder 10. Spring 20 as shown by broken lines in FIG. 1, is flattened toward wall 22 when the holder is inserted into the housing.

The locking mechanism for holder 10 comprises a spring member which is formed integrally with the rear wall 22 of the housing. The spring member comprises a first leaf spring 24, which is capable of deflection in a direction which is generally transverse to the plane defined by a stored disc 12, and a second leaf spring 26, which is capable of defelection in a direction transverse to the direction of deflection of spring 24. Spring 26 is integral with spring 24 and is provided, on its free end, with a hook or projection 28. The shape of leaf spring 26 and projection 28 may be seen from FIG. 3. The locking system also comprises a cam arrangement, carried by holder 10, which will be described below.

The disc holder 10 is provided with a hub 30 which projects upwardly therefrom. Hub 30 is commensurate in size and shape with the central hole of disc 12. Thus, upon insertion of a disc into holder 10, it is positioned over hub 30 and pressed downwardly so that it is engaged by the hub.

Recessed guide channels extend inwardly, generally toward the front thereof, from the end 32 of holder 10. These channels define the camming arrangement of the locking mechanism. The projection 28 on leaf spring 26 will enter and be guided along these channels during locking and unlocking. Locking results from the insertion of the holder 10 into the housing and unlocking is produced by renewed pressure in the insertion direction.

Starting from the disc holder ejected position shown in FIG. 1, if the holder is pushed into the housing against the bias of spring 20 the projection 28 will, following the path indicated by the arrow, contact a first control face 34. This will result in the deformation of spring 26. When projection 28 reaches the end of control face 34 it will slide through passage 36 and, because of the bias provided by spring 26, projection 28 will spring back to its initial position whereupon it will be hooked behind a locking edge 38. The holder 10 is thereby locked in the inserted position. If the holder is now again pushed inwardly, the projection 28 will be caused to slide along a second control face 40 and, while so doing, projection 28 will encounter a ramp 42. Accordingly, when the holder is pushed inwardly while in the locked position, both of springs 26 and 24 will be deflected and projection 28 will move to the position where it "falls" off the cam arrangement. If the holder is now released, the ejection spring 20 will be able to push it out of the housing, the projection 28 sliding along edge 44 of the cam arrangement during the ejection stroke. After the projection 28 passes the end edge 46, the tension on spring 26 will be relieved and the projection 28 will return to its initial position. A similar locking system, where the camming surfaces are mounted on the housing and the spring arrangement is carried by the slidable record media holder, is shown and described in contemporaneously filed U.S. patent application Ser. No. 645,071 entitled "DEVICE FOR STORING GRAMOPHONE AND VIDEO DISCS".

Holder 10 is provided, adjacent the front panel 50 thereof, with a pair of cut-outs 48 which extend inwardly past the outer diameter of disc 12. Accordingly, when the holder is in the ejected position, the disc 12 may be grasped at a pair of opposed points by the user and lifted manually over front panel 50.

The hub 30 forms a support member which both couples the record disc to the holder, so that the disc will move reliably with the holder, and absorbs kinetic energy thus preventing the disc from being catapulted from the holder when the mechanical stops 18 arrest the ejection stroke.

A modified disc holder, which does not include an integral rigid front panel 50, is partially shown in FIG. 2. In the FIG. 2 embodiment the hub 30 has, about the base thereof, a coaxial annular support ring 52. The recording track-free inner edge of a record disc will lie on support ring 52 and thus the recording tracks on the dics will be spaced from the more deeply recessed main surface 54 of the disc-receiving region of the holder. A truncated cone-shaped region 56 joins the recessed region 54 to the main base portion 58 of the holder. Since the holder of FIG. 2 does not have a front panel 50, it may be provided with a cut-out 60 which extends inwardly from the front edge 62. The purpose of recess 60 is, of course, to permit the user to grasp both sides of the record disc in edge regions which do not contain recorded information.

Referring again to FIG. 1, the various components of the present invention preferably comprise injection moulded plastic parts and in order to permit the springs 24 and 26 to be formed integrally with the rear wall 22 of the housing the rear wall 22 will be separately manufactured and will subsequently be adhesively bonded or ultrasonically welded to the side walls 16. The side walls 16, in turn, will be injected moulded together with a top wall 64 and a bottom wall 66 (see FIG. 3).

Referring now to FIG. 3, a number of alternative disc holder designs in accordance with the present invention are shown mounted in a pair of interlocked housings. In actual practice, of course, all of the disc holders supported in a single housing would be of the same type.

The uppermost holder, indicated generally at 68, is characterized by a slotted hub 70 which engages a disc to be stored. By providing slots 72 in hub 70, a degree of resiliency is imparted to the hub so that it may flex inwardly. Hub 70 is also provided with an outwardly extending upper lip or rim portion 74. The hub will flex inwardly when a disc is pressed downwardly thereagainst thus allowing the disc 76 to pass rim 74 which subsequently snaps back to its initial position to lock the disc on the holder.

Proceeding downwardly in the upper housing, the second holder, indicated generally at 78, has a circular recess in the upper surface thereof. The record disc 80 is simply placed in this recess and is retained therein during the ejection stroke by contact between the disc and the shoulder which defines the edge of the recess. As an alternative, the disc 80 could be supported on an annular shoulder so as to span an aperture in the disc.

Holder 78 is provided with grooves 82 in its lower surface. The grooves 82 are engaged, from below by projections 86 which extend from the adjacent lower holder, which has been indicated generally at 84. The grooves 82 may be longer than the distance traveled by the holder during the ejection stroke. The projections 86 assume the drive function for holder 84 and, since they cooperate with the grooves 82, the projections 86 define a comb-like arrangement through which the record disc cannot slip when the holders are positioned one above the other. The front wall 88 of holder 84, which carries a release button 90, performs the disc restraining function. Referring to FIG. 6, it is preferable for the release button 90 to project beyond the front wall of the holder by a distance, indicated at 92, which is greater than the amount of travel, indicated at 94, of the holder required to perform the unlocking operation described above. This arrangement tends to insure that several holders will not inadvertently be simultaneously unlocked.

The holders 68, 78 and 84, which have been described above, are all provided with access openings which enable a record disc mounted thereon to be grasped and lifted up over a rigid front panel. Such access openings may be of the type indicated at 48 in FIG. 1 or the type indicated at 60 in FIG. 2. The need to manipulate a record disc, so as to lift it over a front wall of the holder, requires a rather delicate touch in view of the small size of compact discs. The use of a compact disc storage system can be facilitated by making provision for disc removal by movement in the direction of the ejection stroke or, alternatively, by presenting the disc with its edge raised above the top of the holder front panel at the end of the ejection stroke. The embodiments to be described below in the continued discussion of FIG. 3 eliminate the need to lift a disc upwardly over a wall prior to withdrawal from the holder.

Referring now to the holder which has been indicated generally at 96 in FIG. 3, the front wall 98 is pivotally attached to the holder by means of a pair of arms 100, 102. Accordingly, front wall 98 may, after the ejection stroke has been completed, be pivoted so as to permit withdrawal of a record disc in the forward direction. The front wall 98 functions as a retaining member for holder 96 since it will not be raised until the ejection stroke has been completed.

The next holder, proceeding downwardly from the top of the upper housing shown in FIG. 3, has been indicated generally at 104. Holder 104 is identical to the holder of FIG. 2 as described above.

The lowermost holder of the upper housing of FIG. 3, indicated generally at 106, has a movable front wall 108 which is connected to the remainder of the holder by means of arms 110. The arms 110 are supported by means of slide pins engaged in a pair of parallel, angled slots 112 in side plates of holder 106. Upon ejection of holder 106, the front wall 108 and arms 110 will move downwardly, guided by slots 112, under the influence of gravity so as to assume the position shown in FIG. 3. The arms 110 are provided, on their inwardly facing ends, with cam surfaces 114 which cooperate with the edge of the housing, or the top of the front panel or wall of the next lower holder, to force the front wall 108 upwardly, by wedging action, to the disc restraining position it assumes with the holder inserted in the housing.

Before describing the various holders which are shown supported within the lower of the two housings of FIG. 3, it is believed desirable to again direct attention to the fact that all of the holders in the upper housing, as well as those in the lower housing, are provided with an ejection spring and locking mechanism which may be of the types described above in the discussion of FIG. 1. It is also to be noted that, while a pair of interlocked housings are shown in FIG. 3, a single housing could be employed which would accept twelve or more individual disc holders, i.e., the overall housing of FIG. 3 could be of one-piece construction. Alternatively, each individual record disc holder could be provided with its own housing and these housings interlocked to form a module having the requisite storage capacity.

Continuing to describe FIG. 3, the uppermost holder in the lower housing supports a record disc in the same manner as the holder of FIG. 2. However, the holder is also provided with grooves 82 in its lower surface and these grooves are engaged by projections which extend upwardly from the next lower holder, indicated generally at 116. Thus, the uppermost holder in the lower housing of FIG. 3 cooperates with the disc holder disposed immediately beneath in the same manner as described above with respect to holder 78.

Record disc holder 116 has an integral front wall 118. A lifting element, in the form of an L-shaped arm 122, is articulated to front wall 118 of holder 116 by means of pivot pins 120. The free end of arm 122 is resiliently biased to the position shown in the drawing by means of a spring 124. Lifting arm 122 engages the underside of a record disc 126 mounted on holder 116 and lifts the edge of the disc above the front wall 118 of holder 116. Upon insertion of the holder into the housing, the arm 122 is pushed downwardly as a result of the track-free upper edge portion of the disc cooperating with a front edge of the housing or a holder disposed directly above the holder 116, such cooperation producing a wedging action.

Record disc holder 128 is shown in profile. Holder 128, in addition to employing a disc-holding arrangement comprising hub 30 and ring 52 as shown in FIG. 2, also supports a record disc at its track-free outer edge by means of a recessed rim portion 130.

Disc holder 132, which has been shown in the ejected position, is provided with pair of oppositely disposed side panels 134. The side panels 134 are each provided with a guide slot 136 which extends rearwardly and upwardly as shown. Guide pins 138, which extend outwardly from the opposite sides of a lift bracket 140, are positioned in respective of slots 136. The lifting bracket 140, at the end opposite to that which is provided with the guide pins 138, has outwardly extending control pins 142. The control pins 142 are received in elongated guide slots in side walls of the housing, these slots extending parallelly with respect to the base of the holder 132. The control pins 142 contact ends of their associated guide slots at each extreme position of the holder 132. The length of the guide slots in which the pins 142 move, however, is shorter than the distance traveled by holder 132 during the ejection stroke. Accordingly, the lifting bracket 140 oscillates between a lifting position, which is illustrated in FIG. 3, and a lowered position. In the lifting position the bracket 140 lifts a record disc 144 such that the leading edge thereof is positioned above the front wall 146 of the holder 132. During insertion of holder 132 into the housing the pins 138 will move to the bottom of guide slots 136 and the disc will thus be returned to its storage position where it is situated below the top of the front wall 146 of holder 132.

Disc holder 150 is similar to that described above with respect to the embodiment of FIG. 2 with regard to the function of the driver member and restraining member. However, holder 150 does not have a cut-out, such as the cut-out 60 of FIG. 2, in its front wall. Rather, the front wall of holder 150 extends across the entire width of the housing and thus closes the open side of the housing when the holder is inserted therein. Holder 150 is provided with an opening 154 in its base to enable removal of a record disc such as is indicated at 152. When the holder 150 is in the ejected position, the user will insert a finger through opening 154 from below, lift the disc 152 away from the hub 30 and pull the disc out in the forward direction over the front wall of the holder.

The lowermost holder in the lower housing of FIG. 3, indicated generally at 160, is characterized by telescoping withdrawal means. Thus, the holder includes I-beam shaped guide rails 164 which may be withdrawn by approximately half the depth of the housing by means of tension springs 162. The rails 164 are guided, so as to slide along the side walls of the housing, by ribs 166 integrally formed on the inside of the housing side walls. The actual record disc supporting portion of holder 160 is provided, in its side portions, with outwardly extending ribs 168 which engage the inwardly facing channels defined by the I-beam shaped rails 164. Accordingly, the record disc holder may be displaced relative to the rails 164, also by approximately half the depth of the housing. The total travel path of the holder 160 is thus sufficiently large for a disc supported thereon to be lifted freely upwards away from the hub 170. Grasping of the disc may be facilitated by the provision of lateral indents 172 which are similar to the cut-outs 48 shown in FIG. 1 but have less depth. The indents 172 may, because of the degree of extension of holder 160, be centered on the axis of hub 170.

Turning now to FIG. 4, the uppermost holder is shown as having projections 174 which engage slots 176 formed on the inside of the top wall 178 of the housing. The uppermost holder is additionally guided by cooperation between outwardly extending integral guide rails 14 and guide slots 180 formed in the side walls 16 of the housing. Proceeding downwardly, the second of the disc holders shown in FIG. 4 is shaped so as to have concave upper and lower surfaces as indicated at 184. The provision of a record disc support surface which is concave, i.e., has a shallow dished profile, insures that the portions of a record disc which have recorded information thereon cannot come into contact with a support surface on the holder during insertion. That is, regardless of how inexpertly a disc is inserted into the gap between a pair of holders, such as the second and third holders of FIG. 4 (proceeding downwardly from the top of the housing), the disc can come into contact with a surface region of such holders only in its non-sensitive outer edge region. The disc holder 186 has a similar shape to that of holder 182 but is supported in the housing by means of guide grooves 118 in the side thereof that receive guide rails 190 formed integrally with the side walls 16 of the housing.

The dished profiles 184 of the holders of FIG. 4 may, and preferrably will, be employed in many of the various holder embodiments shown in FIG. 3.

As mentioned above, any single housing in accordance with the present invention will be provided only with record disc holders of the same type.

Referring now to FIGS. 5 and 7, FIG. 6 having been briefly discussed above, the positioning of the release buttons for the disc holders of the present invention will be discussed. The positioning of the release buttons 90 is important since the height dimensions of the record disc holders have, to facilitate understanding of the invention, been exaggerated in the drawings. In actual practice, the individual holders will be spaced from one another by a distance on the order of 5 mm or less. If the release buttons 90 of all of the slider members or record disc holders accommodated in a single housing were to be arranged in a vertical row, it would be virtually impossible to release an individual holder by finger pressure alone. It is therefore preferred, as indicated in FIGS. 5 and 7, for the release buttons 90 of adjacent holders to be laterally staggered. As shown in FIG. 5, the buttons may have a width which approximately corresponds to the size of the average fingertip. As an alternative, very narrow release buttons, as shown in FIG. 7, may be provided. In the embodiment of FIG. 7 the release buttons are not disposed across the entire width of the housing and a space is therefore provided to one side of the button 90 which is situated closest to the center line of the housing. This space is employed for equal-size inscription (label) receiving slots 192 which are optionally protected by see-through covers 194.

FIG. 5 also illustrates the undercut ridges 200 on the top wall 64 of the housing. The housing will also be provided with complementary shaped locking grooves in its bottom wall 66. The provision of these ridges and grooves per its identical housings to be interlocked in a stack to form a large filing or archiving system.

Turning now to FIG. 8, an embodiment is depicted wherein the record disc holders have rigid front walls 210 formed integrally therewith. The front walls 210 are, however, cut away as indicated at 212 and this cut-out is extended into the base 214 of the holder as indicated at 216. An insert 218 having an "L-shaped" profile is hinged to holder base 214 at the inner end of the cut-out, the insert 218 being complementary in shape to the cut-out. The longer arm of the insert 218 is provided with a hook 220 on the side thereof which faces away from the record disc, indicated at 230, supported on the holder. When insert 218 is pivoted upwardly and the holder inserted in the housing 224, the hook 220 engages a recess in the floor 226 of housing 224 or locks behind the front wall of a lower holder. The holder is thus locked against the bias of an ejection spring. By lifting the other or short arm 228 of insert 218, which functions as a release button, the holder may be unlocked. As shown, the record disc 230 rests with its outer edge supported on a recessed rim 232. In the ejected position of the holder, wherein the insert 218 has been pivoted downwardly, the user is able to extend his fingers through the open region of front wall 210, grasp the disc on its opposite sides in the edge region thereof, and lift the disc above front wall 210 and pull it out of the holder. This process is, of course, reversed when the disc is reinserted.

The arrangement of FIG. 8 is particularly useful in the motor vehicle environment because the individual record disc holders need travel only along a very short path between the inserted and ejected positions.

The container or magazine of the embodiment of FIGS. 9 and 10 includes a housing 310. Housing 310 receives and supports a plurality of individual holders 312. Each of holders 312 is designed to receive a single record disc. The holders 312 are supported, in the FIG. 9 embodiment, one above the other and are slideable with respect to housing 310 so that they may be moved between an inserted or storage position and an ejected position where the stored disc, one of such discs being indicated at 318, are presented for removal and use. The holders 312 will be individually spring biased toward the disc removal position. The holder which is third from the top in the FIG. 9 embodiment is shown in the ejected or removal position. Each holder is provided with a top wall which has a leading edge in the form of a flap 320. The flaps 320 are biased upwardly by springs 322. The holder top walls cooperate with the side walls 324 and bottom walls 316 to define a disc receiving pocket. The extent of travel of the holders 312 will be limited by cooperating mechanical stops on the holders and the interior of the housing. In the inserted position the holders 312 are locked against the bias of the ejection springs. The locking mechanism for each holder may be individually released, a selection button 314 being provided on the front of each holder for this purpose. In accordance with a preferred arrangement, as discussed with respect to FIG. 1, the locking of a holder will automatically occur when it is inserted into the housing 310 and unlocking is accomplished by renewed pressure on the inserted holder until it again contacts the motion limiting stop. As may be seen from FIG. 10, a pair of side wall portions 324 of holder 312 support a pair of oppositely acting leaf-springs 326. The springs 326 are positioned and shaped such that, when the disc 318 is inserted, they are first deflected. As insertion continues, when the width of the disc portion positioned between the springs 326 becomes less than the disc diameter, springs 326 will exert an inwardly directed force on the disc which assists the insertion process. When the holder 312 is ejected from housing 310 the springs 326 will exert a restraining, i.e., an energy absorbing, influence which prevents the disc from itself being ejected from the holder. The spring arrangement of FIG. 10 may be employed in other of the disclosed embodiments of the present invention. In the interest of facilitating understanding of the invention the spring arrangement of FIG. 10, or an equivalent arrangement, has not been shown with respect to the other disclosed embodiments.

It is to be noted that, in the interest of enhancing the compactness of the storage system, it is possible to eliminate the top wall of the "holders" 312. In such case the individual "holders" will terminate at the top of the vertical walls 324 and the bottom of the holder 312 positioned immediately above in the stacked arrangement will be concave on both sides so that it may serve as the top of the disc-receiving pocket. If the top wall of the "holders" 312 is omitted there will not be a spring biased flap 320.

The profile of the individual holders 312, as best shown in FIG. 11, can be employed in all embodiments of the present invention. This profile insures that only the edges of the disc, and never the portion thereof which contains the recorded information, contacts a portion of the holder.

The embodiment of FIG. 12 differs from that of FIG. 9 primarily in that the front portions of the top and base walls of the "plate" of each holder, a "plate" being indicated at 328 in FIG. 12 and including top, side and base members, are provided with hinged portions. Thus, in the FIG. 12 embodiment each holder has a pair of flaps 330, 332 which are biased in the open direction by springs 334 when the holder is in the ejected, i.e., disc removal, position In the FIG. 12 embodiment the front of the pocket defined by each "plate" is formed by a lip 336 on flap 332, lip 336 comprising an extension of the selection (release) button 338.

In the embodiment of FIG. 13 the holders each include a U-shaped element 342 which is slideably guided in the housing 340. The elements 342 are biased toward the disc removal position by means of a spring arrangement, not shown, and are retained in the housing 340 by means of a manually releasable locking mechanism, also not shown. The forwardly extending arms of the U-shaped elements 342 each define a frame which supports an envelope defining member indicated generally at 344. The envelope defining members 344 have a bridge 346 at the front edge thereof. The "bridge" 346 is comprised of a resilient member which, in the ejected position of the holder, naturally spreads apart to define an oval-shaped access opening. The ends of the legs of the U-shaped elements 342, i.e., the open ends of the "U", are interconnected by means of closure bars 348. Closure bars 348 includes parallel side pieces 350 which are pivotally connected to the U-shaped element 342 as shown. In order to remove a disc 318 from the envelope defining member 344, the closure bar 348 is rotated upwardly or downwardly out of alignment with the spread-open bridge 346. The entire envelope defining member 344 can be comprised of a resilient plastic. Alternatively, the bridge member 346 and the lateral side pieces 352, by which the remainder of the envelope defining member 344 is attached to U-shaped element 342, can be fabricated from sheet metal. In the disclosed embodiment an envelope 354, comprised of a plastic film, is clamped onto the bridge member 346 and defines the disc receiving pocket. In either construction, as in the embodiments of FIGS. 9 and 12, all rigid portions of the individual record disc holders will be sized and shaped so that they can contact only edge portions of a disc inserted therein.

In the embodiment of FIG. 14 the envelope defining member 356 is comprised of a resilient plastic. However, unlike the FIG. 13 embodiment wherein the bridge member 346 has a bias toward the open position, the envelope defining member 356 of the FIG. 14 embodiment has a bias toward the closed position. In the FIG. 14 embodiment the closure bar 360 is constructed such that the side pieces 358 thereof have cam surfaces 362 which, when the closure bar is pivoted downwardly, exert a lateral compressive force on member 356. This lateral force, i.e., the narrowing of the space between the opposite edges of the member 356, will result in the opening of the "pocket". In view of the counter-force which acts outwardly, and the size requirements for the camming or wedging surfaces 362, a common U-shaped element 364 is employed in the FIG. 14 embodiment and a selector system, not shown, will insure that the disc holders are only individually ejected.

Figure 15:
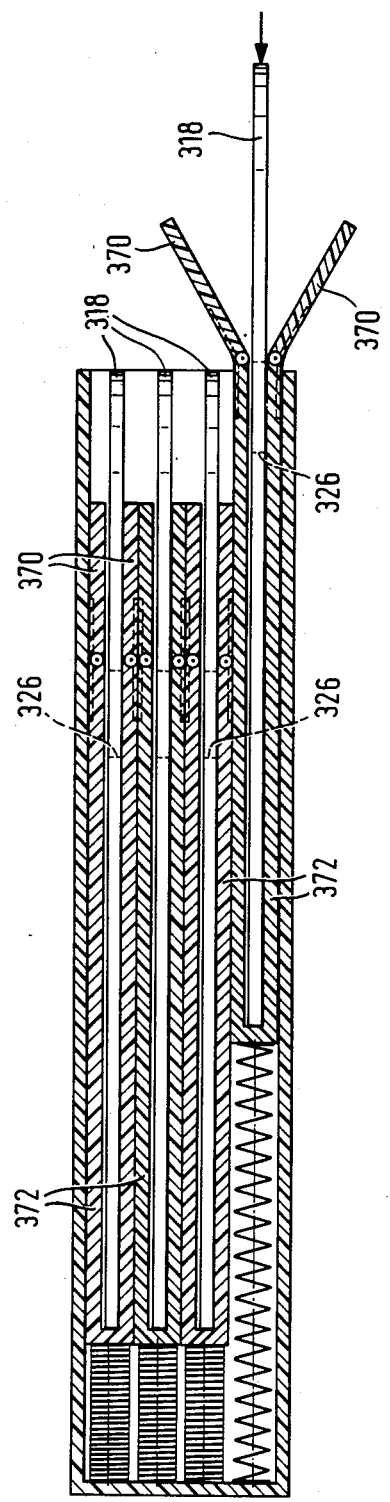
FIG. 15 is a schematic cross-sectional side elevation view of a record disc storage system in accordance with yet another embodiment of invention.

FIG. 15 represents a further embodiment of the present invention which is similar to the above-described embodiment of FIG. 12. In the FIG. 15 embodiment, however, the combined depth of the holder and flaps 370 is less than the diameter of a disc to be stored in the holder. Accordingly, an edge portion of a disc 318 will remain accessible and insertion is accomplished by actually pushing on the edge of the disc. A storage system of the type shown in FIG. 15 will, of course, include springs 326 (FIG. 10) or some equivalent means to insure that a disc cannot accidentally be ejected from the storage system in spite of the absence of closure bars.

The disc storage system of FIG. 16 is very similar to that of FIG. 13. However, in the FIG. 16 embodiment the discs are stored vertically in holders 386. The disc insertion slot 380 of each holders 386 will face upwardly when the holder is in the ejected position with respect to housing 382. In FIG. 16 an ejection spring for one of the holders is indicated schematically at 384 while a selector button, for unlocking the holder 386 to permit ejection thereof, is indicated at 388.

While preferred embodiments have been shown and described various modifications and substitutions may be made thereto without departing from the spirit and scope of the invention. Accordingly, it is to be understood that the present invention has been described by way of illustration and not limitation.

What is claimed is:

1. Apparatus for storing rigid disc-shaped recording media which contain a region of recorded information, said apparatus comprising:
    housing means for defining a container having an internal volume, said housing means having plural walls, some of said walls having edges which lie in a common plane and define a front access opening for the container;
    at least one disc holder supported in said housing means for reciprocal movement through an allocated area of said access opening along a predetermined path between a storage position wherein a disc supported on the holder lies entirely within the container and an ejected position wherein the holder and supported disc lie partly outside the container, said disc holder including,
    means for supporting a disc for movement with the holder along said path, said supporting means including a bottom member having an outer portion for contacting the supported disc adjacent its periphery outside of the region containing the recorded information and a central portion which is delimited by said outer portion and spaced from the region of the disc containing the recorded information, and
    means for positioning and retaining a disc on said supporting means, said positioning and retaining means resiliently engaging selected portions on the circumference of the disc when the holder has reached the ejected position, said positioning and retaining means being located to exert retaining and positioning forces upon the supported disc, said forces being overcome when the disc is manually grasped and pulled generally in a first direction from the ejected holder, said forces also being overcome during placement of a disc on said supported means of the ejected holder by the manual pushing of the disc in a second direction generally opposite to said first direction, said forces urging the disc to the proper position on said supporting means after having been overcome during such placement of a disc on said supporting means;

means for guiding the holder in the reciprocal movement thereof along said path;

biasing means cooperating with said housing means and said holder for biasing the holder toward the ejected position; and means for locking and manually unlocking said holder within said housing means against the bias produced by said biasing means.

2. The container of claim 1 wherein said holder further includes front wall means for substantially covering said housing means opening allocated area when said holder is in said storage position.

3. The container of claim 1 wherein said housing means is adapted to receive a plurality of substantially identical holders, and wherein each holder further includes a front wall member, said front wall members substantially covering said housing means opening when all said holders are in the storage position.

4. The container of claim 2 wherein each of said front wall means includes a front wall subassembly pivotally connected to said supporting means.

5. The container of claim 3 wherein each front wall member is pivotally connected to the supporting means of its associated holder.

6. The container of claim 1 wherein each of said holders further includes disc insertion guide means for carrying said supporting means beyond said housing opening when said holder is in its ejected position.

7. The container of claim 6 wherein said disc insertion guide means has a pair of disc guiding members which cooperate to define a funnel-shaped insertion slot.

8. Apparatus for storing rigid disc-shaped recording media comprising:

housing means for defining a container having a front access opening;

at least one disc holder supported in said housing means for reciprocal movement through an allocated area of the front opening along a predetermined path between a storage position wherein a disc supported on the holder lies entirely within the housing means defined container and an ejected position wherein the holder and supported disc lie partly outside the housing means, each of said disc holders including, means for supporting a disc on the holder for movement with the holder along said path, and means including at least one resilient brake member which engages the circumferential edge of the disc for urging the disc inwardly to a preselected location on said supporting means when the disc is inserted onto said supporting means, said brake member also retaining the disc on the supporting means when the holder has moved along said path in a first direction from the storage position to the ejected position, said disc being released from said brake member upon being manually grasped and pulled generally in said first direction;

means for guiding the holder during its reciprocal movement along said path;

biasing means cooperating with said housing means and holder for biasing the holder toward the ejected position; and means for locking and manually unlocking said holder within said housing means against the bias produced by the means for biasing.

9. The container of claim 8 wherein said holder further includes front wall means for substantially covering said housing means opening allocated area when said holder is in said storage position.

10. The container of claim 8 wherein said housing means is adapted to receive a plurality of holders, and wherein each holder further includes a front wall member, said front wall members substantially covering said housing means opening when all of said holders assume their storage position.

11. The container of claim 9 wherein each of said front wall means includes a front wall subassembly pivotally connected to said supporting means.

12. The container of claim 10 wherein each front wall member is pivotally connected to the supporting means of its associated holder.

13. The container of claim 8 wherein each of said holders further includes disc insertion guide means for carrying said supporting means beyond said housing opening when said holder is in its ejected position.

14. The container of claim 13 wherein said disc insertion guide means has a pair of disc guiding members which cooperate to define a funnel-shaped insertion slot.

15. Apparatus for storing at least one rigid compact disc containing a region of recorded information, comprising:

a housing having plural walls which define a container, some of said walls having edges which lie in a common plane and define a front access opening for the container;

at least one disc holder slidably mounted in the housing for reciprocal movement through an allocated area of the front opening along a predetermined stroke distance between a storage position whereby the supported disc lies entirely within the housing and an ejected position whereby the holder and supported disc lie partly outside the housing, each of said disc holders including, means cooperating with the housing walls, for guiding the holder in the reciprocal movement along the stroke distance, support means for supporting a disc within the holder for movement with the holder along said stroke distance, a front member connected to the support means, said front member including a cover portion, the front member being displaceable relative to the support means such that (a) when the holder is in the storage position said front member encloses a front portion of the disc and the cover member closes the allocated area of the housing front opening and (b) when the holder is in the ejected position, the front member bilaterally exposes the front portion of the disc so that the disc may be manually grasped and withdrawn, and means including at least one resilient brake member engaging the circumferential edge of the disc, for positioning the disc on the support means relative to the front member a the disc is placed upon said support member, for retaining the disc on the support member when the holder has moved along the stroke distance to the ejected position and for releasing the disc when the disc is manually grasped;

means operatively associated between the housing and the holder, for biasing the holder toward the ejected position; and means for manually locking and unlocking each holder within said housing against the bias produced by the means for biasing.

* * * * *